Patented Oct. 21, 1924.

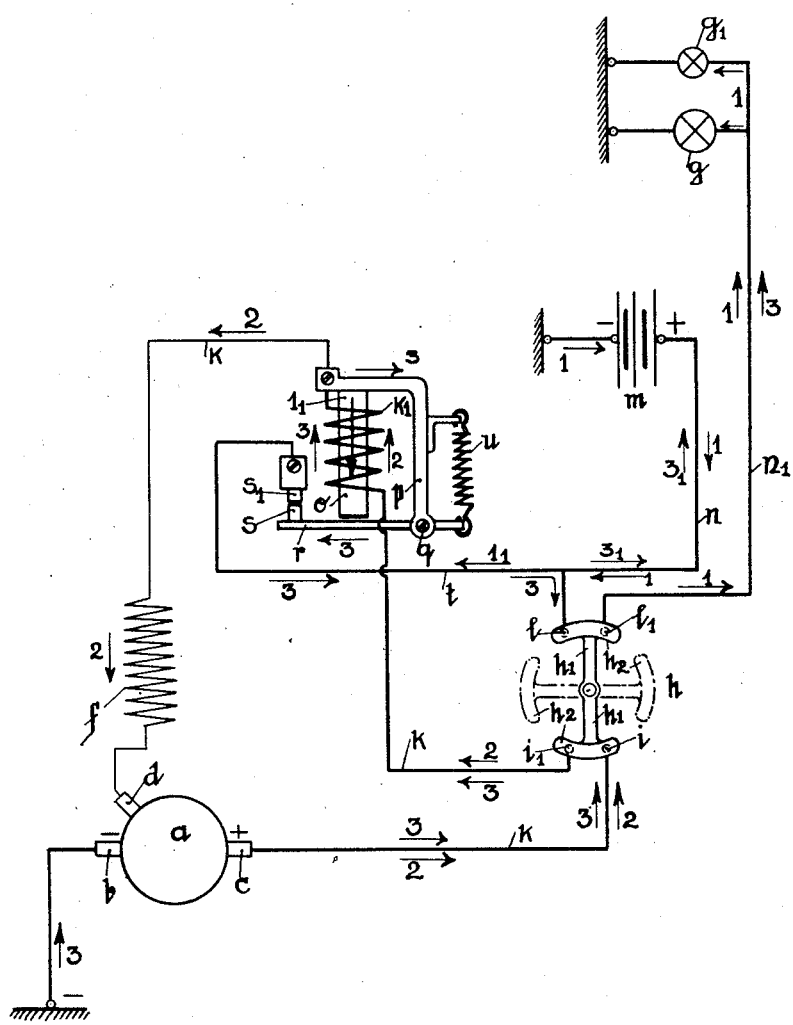

1,512,105

UNITED STATES PATENT OFFICE.

KARL KNAPP, OF HALLE-ON-THE-SAALE, GERMANY.

ILLUMINATING PLANT FOR VEHICLES, SPECIALLY MOTOR CYCLES.

Application filed April 25, 1922. Serial No. 556,553.

*To all whom it may concern:*

Be it known that I, KARL KNAPP, a citizen of the German Republic, residing at Halle-on-the-Saale, Germany, have invented certain new and useful Improvements in Illuminating Plants for Motor Vehicles, Specially Motor Cycles, of which the following is a specification.

Electric illuminating plants for motor vehicles are already known in which the dynamo works together with a battery and with an automatic cut-out for the return current from the battery. In order to dispense with special regulators working on constant voltage dynamos are used which by means of an exciting winding, put in shunt to an auxiliary brush, keep constant intensity of current at varying speed of the vehicle. These dynamos are constantly connected with the battery and charge the same during the travel always, also if the vehicle is running without illumination, as long as it is not cut out by a separate automatic device for limiting the charging. Without this device overcharging of the battery would be unavoidable. On the other hand an automatic cut-out is required, besides the devices for limiting the charging, which protects the dynamo against return current from the battery. A cut-out for the return current from the battery used in connection with a dynamo of other type has a voltage coil connected in parallel to the armature of the dynamo which is excited at the starting of the driving motor. The traction force of the spring acting upon the oscillable contact armature is in this case calculated so that it is overcome only at an excitation by the electromagnet which corresponds with the normal machine voltage. The contact lever closes the main circuit only at a number of revolutions of the dynamo which does no longer permit a return current from the battery. If the contact armature has connected the dynamo with the battery the full dynamo current is sent through a second coil, the so-called current coil. The contact armature is thus pressed still stronger upon the contact surfaces and reduces further the intermediate resistance. If now the number of revolutions of the dynamo decreases so that a return current from the battery would occur in the dynamo the current coil is no longer excited, as before, in the same sense as the voltage coil but, as the current has altered its direction in the meantime, in the opposite sense. The comparatively weak field produced by the voltage coil is therefore weakened, as soon as the return current sets in, in such a manner that the traction force of the spring becomes superior, whereby the main current is interrupted before a strong return current sets in.

A cut out for the return current has become known which works merely with one single coil to which only main current is supplied, said coil being neutralized by the battery return current flowing back through said coil. This cut out would however, if it were inserted in the lighting plant of motor vehicles, attract its armature only so late that shocks occurring at the starting might, under certain conditions, prevent the closing of the main current circuit.

Illuminating plants of this type are expensive and they are nevertheless submitted to frequent interruptions of service owing to the strong shocks which occur frequently in the motor vehicle service.

They require further, owing to the cut-out for the charging current and to the two-coiled thick cut-out for the return current, far too much space to be mounted upon small sized vehicles, and much less upon motor cycles, which are already overloaded.

This invention has for its object to provide a simple illuminating plant in utilizing the well known dynamo which keeps constant intensity of current with varying numbers of revolution, and which is not sensitive to shocks and so small that it can be easily mounted upon small motor cars and upon motor cycles.

With this object in view the following measures have been taken:

1. This dynamo, which keeps automatically constant intensity of current is so constructed and dimensioned that it produces current only if the vehicle is running with the lamp cut in, the battery being charged up so weakly that no automatic device for limiting the charging is required.

2. Instead of the well known two-coil cut-out for the return current from the battery only a mono-coil cut-out known per se for the return current is used but arranged so that both the exciting-current and the main current are sent in the same direction through the coil of this cut-out which consists of only a few windings of thick wire, the return current from the battery being conducted in the manner known per se through said coil in opposite direction so that at the closing of the exciting circuit across the light-switch and the coil the armature of the cut-out is strongly attracted at once at the starting and the production of useful current is ensured notwithstanding the strong shocks which might occur.

Owing to the omission of a device for limiting the charging and owing to the selection of the cut out connected as described it has become possible to make the plant cheap, of small size but nevertheless secure in service.

An embodiment of an illuminating plant according to the invention is shown by way of example diagrammatically on the accompanying drawing.

At the armature $a$ of the dynamo, besides the minus brush $b$ and the plus brush $c$, an auxiliary brush $d$ is applied in a manner known for the illumination and for the battery charging of large sized motor vehicles with special starting motor and between this auxiliary brush $d$ and the plus brush $c$ an exciter $f$ is applied in shunt circuit. A constant intensity of current is thus ensured for the dynamo from a determined minimum travelling speed on. The dynamo is wound and constructed, according to the invention, in such a manner that it effects, besides the feeding of the current consumers $g$, $g'$, only a weak charging of the battery. If the dynamo would be used for charging the battery also at day time, this battery would be exposed to continuous over-charging and to rapid destruction if no automatic device for limiting the charging were provided. In order to economize such a device for limiting the charging, which device requires much space, is very sensitive and consequently dangerous for the illuminating plant, the light switch $h$ is inserted, according to the invention, between the connecting terminals $i$, $i'$ of a lead $k$, which is, in accordance with the invention, common for the exciting circuit and for the main circuit, and the connecting terminals $l$, $l'$ of the lead $n$, $n'$ which conducts from the battery $m$ to the lamps or other current consumers $g$, $g'$. By the switch arms $h'$ the metallic switching bridges $h^2$ are insulated the one from the other. In a fundamentally novel manner the well known single coil $k'$ of the core $o$ of the magnet is formed by the common exciting- and main current-lead $k$. The main current branches off from this coil across the armature $r$ of the cut-out hinged at $q$ to its support $p$, across the contacts $s$, $s'$ and through the lead $t$ to the battery lead $n$. A spring $u$ tends to separate the contact $s$ from the fixed contact $s'$.

The switch and the cut-out for the return current can be both accommodated in a small switch box which can be easily fixed at the rear of the battery box, in front of the cyclist.

The illuminating plant operates as follows:—

1. Voyage at day time: The light switch $h$ is in the open position indicated in dash lines in which current is neither produced nor can it be supplied from the battery to the consumers.

2. Voyage at night time: If the switch is brought to the closed position shown in full lines, current flows, as long as the motorcycle is stopped, in the direction of the arrows 1 from the battery $m$ through the lead $n$ to the terminal $l$, across the bridge $h^2$ to the terminal $l'$, through lead $n'$ to the lamps $g$, $g'$, to the mass of the cycle and back to the battery. The lamps burn, being fed from the battery.

At the starting the exciting current is developed in being rapidly strengthened in the direction of the arrows 2. It flows from the plus pole $c$ through the lead $k$ to the terminal $i$, across bridge $h^2$ to terminal $i'$ and thence through the coil $k'$ of the electromagnet and through the exciter winding $f$ across the auxiliary brush $d$ back to the plus pole $c$. As the coil $k'$, which is also inserted in the main current, must be made of the thick wire required for the main current, it needs have only a few windings. It requires therefore only little space. The space usually occupied by the voltage coil is also economized as no voltage coil is produced. Owing to the suppression of the separate voltage coil which hitherto short-circuited the main terminals of the machine always, also at the starting, the exciting current is increased more rapidly and to greater intensity than otherwise. The small magnet coil $k$ generates therefore in the core $o$ of the magnet immediately at the beginning of the voyage such great attracting force that the oscillable armature $r$ is strongly attracted, the spring $u$ being put under tension, and that the contacts $s$, $s'$ is securedly closed. With the contacts $s$, $s'$ the main circuit is closed also so that the main current flows first in the direction of the arrows 3 in the same wire and in the same direction as the exciting current across the coil $k'$, but then across the armature to the lead $n$ of the battery, across contact $l$, switching bridge $h^2$, contact $l'$, lead $n'$, lamps $g$, $g'$ and mass back to the minus pole $b$. The main current which flows also through the coil $k'$ increases still further the magnetism of the core $o$ so that the contact $s$ is strongly pulled against contact $s'$ and these contacts cannot be separated even by the strongest shocks.

If the motor cycle is running with the lowest continuous speed the dynamo produces a small excess of current over the current consumed by the lamps, this excess current flowing in the direction of the arrows 3' into the battery. The battery is thus feebly charged continuously, during the night voyage so that it will be sufficient to feed the lamps during the stops.

3. Stopping of the cycle: In this case the battery current flows finally in the direction l' through the lead t, the contacts s', s, the armature r, the support p of the armature, coil k', terminal i', switching bridge h², terminal i, plus pole c, minus pole b and mass, back to the battery. The battery current is predominant over the exciting and main currents which become gradually feebler and flows in coil k' in opposite direction as these currents until the magnet core o becomes neutral and spring u pulls the armature with its contact s away from contact s' so that the return current is interrupted. The lamps are supplied with current only from the battery.

If the cycle is started again the above described process repeats itself, viz the exciting current flows first through the exciting circuit which is still closed so that the armature is attracted and the contact closing is strengthened by the main current which recharges the battery.

I claim :—

An illuminating plant for motor vehicles, specially for motor cycles, with dynamo, battery and automatic cut-out for the return current from the battery, the oscillating armature of which cut-out closes the main current circuit of the dynamo electro-magnetically and interrupts the same by spring action directly before the contact is established if the vehicle is started, comprising in combination a dynamo of well known type, an auxiliary brush, an exciter winding applied in shunt connection to said auxiliary brush so that the dynamo keeps the same intensity of current also if the speed of travel varies, said dynamo producing a quantity of current slightly in excess of the current consumed, a battery, a single coil cut-out, a light switch designed to close simultaneously the battery circuit for the lamps and the exciting-circuit which goes across the single interrupter coil and the field winding, said dynamo working together with said battery, single-coil cut-out and light switch in such a manner that over one of the bridges of the light switch the exciting current circuit is first closed across the single magnet coil and the armature of the cut-out connected between the cut-out coil and the field winding is strongly attracted at the beginning of the travel, so that the closing of a main circuit is effected which passes through the same lead with the exciting current to behind the magnet coil, whereupon said main current is connected by the armature of the cut-out and its contacts with a battery- and consumer-circuit adapted to be closed only across the other bridge of the light switch, the contact pressure of the armature being simultaneously increased, and that, if the vehicle stops, all the circuits, with the exception of the battery-consumer circuit, are interrupted by the return current from the battery in the single coil.

In testimony whereof I affix my signature in presence of two witnesses.

KARL KNAPP.

Witnesses:
D. MUTH,
CARL H. MÜLLER.